United States Patent
Wada et al.

(10) Patent No.: US 11,443,558 B2
(45) Date of Patent: Sep. 13, 2022

(54) HAND-EYE, BODY PART MOTION RECOGNITION AND CHRONOLOGICALLY ALIGNED DISPLAY OF RECOGNIZED BODY PARTS

(71) Applicant: OMRON Corporation, Kyoto (JP)

(72) Inventors: Hirotaka Wada, Kyoto (JP); Kenta Nishiyuki, Osaka (JP); Yuji Mizuno, Nara (JP); Masashi Miyazaki, Nara (JP); Danni Wang, Kyoto (JP); Yoshikazu Mori, Yamatokoriyama (JP); Endri Rama, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/070,886

(22) Filed: Oct. 14, 2020

(65) Prior Publication Data

US 2021/0142049 A1    May 13, 2021

(30) Foreign Application Priority Data

Nov. 12, 2019    (JP) ............... JP2019-204983

(51) Int. Cl.
*G06K 9/62* (2022.01)
*G06V 40/19* (2022.01)
(Continued)

(52) U.S. Cl.
CPC .......... *G06V 40/28* (2022.01); *G06K 9/6256* (2013.01); *G06V 10/462* (2022.01); *G06V 20/20* (2022.01); *G06V 40/19* (2022.01); *G06V 40/23* (2022.01)

(58) Field of Classification Search
CPC .......... G06K 9/00355; G06K 9/00342; G06K 9/00604; G06K 9/00671; G06K 9/6256;
(Continued)

(56) References Cited

U.S. PATENT DOCUMENTS

| 7,853,051 B2 * | 12/2010 | Ota | G06K 9/00335 382/118 |
| 9,358,456 B1 * | 6/2016 | Challinor | A63F 13/428 |

(Continued)

FOREIGN PATENT DOCUMENTS

| CN | 110705390 A | * | 1/2020 | ......... G06K 9/00342 |
| JP | 2003050663 | | 2/2003 | |

(Continued)

OTHER PUBLICATIONS

Chen Yu and D. H. Ballard, "Learning to recognize human action sequences," Proceedings 2nd International Conference on Development and Learning. ICDL 2002, 2002, pp. 28-33, doi: 10.1109/DEVLRN.2002.1011726. (Year: 2002).*

(Continued)

*Primary Examiner* — Michael Robert Cammarata
(74) *Attorney, Agent, or Firm* — JCIPRNET

(57) ABSTRACT

Provided is a motion recognition apparatus capable of individually recognizing motions performed using each body part. A motion recognition apparatus (10) includes: an acquisition unit (11) configured to acquire time series information regarding motions of an operator; a motion recognition unit (12) configured to recognize, on the basis of motion information that defines individual motions and the time series information, a motion of the operator corresponding to any one of the individual motions for each body part of the operator and generate a motion recognition result including a start time and an end time of the one of the individual motions corresponding to the recognized motion of the operator for each body part of the operator; and a display unit (13) configured to display the motion recognition result of each body part in a chronologically aligned manner on the basis of the generated motion recognition result.

18 Claims, 8 Drawing Sheets

(51) Int. Cl.
*G06V 40/20* (2022.01)
*G06V 10/46* (2022.01)
*G06V 20/20* (2022.01)

(58) Field of Classification Search
CPC ........ G06V 40/28; G06V 40/23; G06V 40/19; G06V 10/774
See application file for complete search history.

(56) References Cited

U.S. PATENT DOCUMENTS

| | | | | |
|---|---|---|---|---|
| 10,706,584 | B1* | 7/2020 | Ye | G06F 3/011 |
| 10,943,136 | B1* | 3/2021 | Chan | G06K 9/00845 |
| 10,956,724 | B1* | 3/2021 | Terrano | G06F 3/0425 |
| 2009/0027337 | A1* | 1/2009 | Hildreth | G06F 3/0482 |
| | | | | 345/158 |
| 2012/0088544 | A1* | 4/2012 | Bentley | A63B 69/36 |
| | | | | 455/556.1 |
| 2012/0143358 | A1* | 6/2012 | Adams | G06K 9/00342 |
| | | | | 700/92 |
| 2014/0225825 | A1* | 8/2014 | Yamamoto | H04N 21/44218 |
| | | | | 345/156 |
| 2014/0294360 | A1* | 10/2014 | Raptis | G06K 9/6278 |
| | | | | 386/239 |
| 2016/0216770 | A1* | 7/2016 | Jang | G16H 20/30 |
| 2017/0318019 | A1* | 11/2017 | Gordon | H04L 9/3226 |
| 2018/0121728 | A1* | 5/2018 | Wells | A61B 5/1495 |
| 2019/0045158 | A1* | 2/2019 | Osanai | H04N 1/2112 |
| 2019/0046836 | A1* | 2/2019 | Starkey | A63B 69/00 |
| 2019/0294871 | A1* | 9/2019 | Vaezi Joze | G06K 9/00369 |
| 2020/0074158 | A1* | 3/2020 | Kim | G06K 9/00275 |
| 2020/0074380 | A1* | 3/2020 | Mori | G06K 9/00369 |
| 2020/0125839 | A1* | 4/2020 | Chen | G06T 7/246 |
| 2020/0193746 | A1* | 6/2020 | Westmacott | G07C 9/23 |
| 2021/0055802 | A1* | 2/2021 | Kim | G06F 3/0484 |
| 2021/0144303 | A1* | 5/2021 | Miyazaki | H04N 5/23258 |
| 2021/0221404 | A1* | 7/2021 | Reiner | G05D 1/0055 |
| 2021/0271886 | A1* | 9/2021 | Zheng | G06F 16/41 |
| 2021/0287433 | A1* | 9/2021 | Lyons | G06T 19/00 |
| 2021/0311162 | A1* | 10/2021 | Mai | G01S 7/415 |
| 2021/0312572 | A1* | 10/2021 | Niu | G06Q 50/02 |
| 2021/0318749 | A1* | 10/2021 | Ikeda | G06F 3/165 |

FOREIGN PATENT DOCUMENTS

| | | | | |
|---|---|---|---|---|
| JP | 2013045351 | | 3/2013 | |
| KR | 20160093131 A | * | 8/2016 | ......... G06K 9/00342 |
| WO | WO-2014200437 A1 | * | 12/2014 | ............ G06K 9/481 |
| WO | WO-2017075541 A1 | * | 5/2017 | ............ G16H 40/20 |
| WO | WO-2020252599 A1 | * | 12/2020 | |

OTHER PUBLICATIONS

Y. Kuniyoshi, M. Inaba and H. Inoue, "Learning by watching: extracting reusable task knowledge from visual observation of human performance," in IEEE Transactions on Robotics and Automation, vol. 10, No. 6, pp. 799-822, Dec. 1994, doi: 10.1109/70.338535. (Year: 1994).*

K. Ogawara, S. Iba, T. Tanuki, H. Kimura and K. Ikeuchi, "Recognition of human task by attention point analysis," Proceedings. 2000 IEEE/RSJ International Conference on Intelligent Robots and Systems (IROS 2000) (Cat. No.00CH37113), 2000, pp. 2121-2126 vol.3, doi: 10.1109/IROS.2000.895284. (Year: 2000).*

H. Feng, S. Wang, H. Xu and S. S. Ge, "Object Activity Scene Description, Construction, and Recognition," in IEEE Transactions on Cybernetics, vol. 51, No. 10, pp. 5082-5092, Oct. 2021, doi: 10.1109/TCYB.2019.2904901. (Year: 2021).*

J. W. Deng and H. T. Tsui, "An HMM-based approach for gesture segmentation and recognition," Proceedings 15th International Conference on Pattern Recognition. ICPR-2000, 2000, pp. 679-682 vol. 3, doi: 10.1109/ICPR.2000.903636. (Year: 2000).*

H. Narimatsu and H. Kasai, "Duration and Interval Hidden Markov Model for sequential data analysis," 2015 International Joint Conference on Neural Networks (IJCNN), 2015, pp. 1-8, doi: 10.1109/IJCNN.2015.7280808. (Year: 2015).*

P. A. Stoll and J. Ohya, "Applications of HMM modeling to recognizing human gestures in image sequences for a man-machine interface," Proceedings 4th IEEE International Workshop on Robot and Human Communication, 1995, pp. 129-134, doi: 10.1109/ROMAN.1995.531948. (Year: 1995).*

J. Yamato, J. Ohya and K. Ishii, "Recognizing human action in time-sequential images using hidden Markov model," Proceedings 1992 IEEE Computer Society Conference on Computer Vision and Pattern Recognition, 1992, pp. 379-385, doi: 10.1109/CVPR.1992.223161. (Year: 1992).*

N. Liu, R. I. A. Davis, B. C. Lovell and P. J. Kootsookos, "Effect of initial HMM choices in multiple sequence training for gesture recognition," Int'll Conf. on Information Technology: Coding and Computing, 2004. Proceedings. ITCC 2004., 2004, pp. 608-613 vol. 1, doi: 10.1109/ITCC.2004.1286531. (Year: 2004).*

Nianjun Liu, B. C. Lovell, P. J. Kootsookos and R. I. A. Davis, "Model structure selection & training algorithms for an HMM gesture recognition system," Ninth International Workshop on Frontiers in Handwriting Recognition, 2004, pp. 100-105, doi: 10.1109/IWFHR.2004.68. (Year: 2004).*

C. Morimoto, Y. Yacoob and L. Davis, "Recognition of head gestures using hidden Markov models," Proceedings of 13th International Conference on Pattern Recognition, 1996, pp. 461-465 vol. 3, doi: 10.1109/ICPR.1996.546990. (Year: 1996).*

K. Fukuda, I. G. Ramirez-Alpizar, N. Yamanobe, D. Petit, K. Nagata and K. Harada, "Recognition of Assembly Tasks Based on the Actions Associated to the Manipulated Objects," 2019 IEEE/SICE International Symposium on System Integration (SII), 2019, pp. 193-198, doi: 10.1109/SII.2019.8700405 (Year: 2019).*

D. Gehrig, H. Kuehne, A. Woerner and T. Schultz, "HMM-based human motion recognition with optical flow data," 2009 9th IEEE-RAS International Conference on Humanoid Robots, 2009, pp. 425-430, doi: 10.1109/ICHR.2009.5379546. (Year: 2009).*

A. Kubota, T. Iqbal, J. A. Shah and L. D. Riek, "Activity recognition in manufacturing: The roles of motion capture and sEMG+inertial wearables in detecting fine vs. gross motion," 2019 International Conference on Robotics and Automation (ICRA), 2019, pp. 6533-6539, doi: 10.1109/ICRA.2019.8793954. (Year: 2019).*

T. R. Savarimuthu et al., "Teaching a Robot the Semantics of Assembly Tasks," in IEEE Transactions on Systems, Man, and Cybernetics: Systems, vol. 48, No. 5, pp. 670-692, May 2018, doi: 10.1109/TSMC.2016.2635479. (Year: 2018).*

* cited by examiner (A)

19c

| Left hand motion recognition result information | | |
|---|---|---|
| Start time | End time | Motion |
| 00:00.00 | 00:12.00 | NA |
| 00:12.00 | 00:13.00 | Holding |
| 00:13.00 | 00:15.00 | Carrying |
| 00:15.00 | 00:18.00 | Adjustment |
| 00:18.00 | 00:22.00 | NA |
| 00:22.00 | 00:28.00 | Adjustment |

(B)

19c

| Right hand motion recognition result information | | |
|---|---|---|
| Start time | End time | Motion |
| 00:00.00 | 00:10.00 | NA |
| 00:10.00 | 00:11.00 | Holding |
| 00:11.00 | 00:12.00 | Carrying |
| 00:12.00 | 00:15.00 | NA |
| 00:15.00 | 00:18.00 | Adjustment |
| 00:18.00 | 00:19.00 | NA |
| 00:19.00 | 00:20.00 | Holding |
| 00:20.00 | 00:22.00 | Carrying |
| 00:22.00 | 00:28.00 | Adjustment |
| 00:28.00 | 00:29.00 | Storage |

FIG. 4

HAND-EYE, BODY PART MOTION RECOGNITION AND CHRONOLOGICALLY ALIGNED DISPLAY OF RECOGNIZED BODY PARTS

CROSS-REFERENCE TO RELATED APPLICATION

This application claims the priority of Japan patent application serial no. 2019-204983, filed on Nov. 12, 2019. The entirety of the above-mentioned patent application is hereby incorporated by reference herein and made a part of this specification.

BACKGROUND

Technical Field

The disclosure relates to a motion recognition apparatus, a motion recognition method, a motion recognition program, and a motion recognition system.

Description of Related Art

In the related art, among technologies for recognizing motions of a person, there are many technologies for recognizing what kind of motion a target person is doing as a whole. According to Patent Document 1 below, for example, motions of fingers and motions of parts other than fingers such as the head are recognized when sign language is used, and sign language sentences expressed by such motions are interpreted in Japanese. Also, according to Patent Document 2 below, motions that can be performed by a hand gripping a tool and motions that can be performed by a hand not gripping a tool are recognized, and motions performed by a target person in a tool gripping state are recognized.

PATENT DOCUMENTS

[Patent Document 1] Japanese Patent Laid-Open No. 2003-50663
[Patent Document 2] Japanese Patent Laid-Open No. 2013-45351

Incidentally, in manual assembly operations performed in plants or the like, there may be cases in which the operations are performed while different motions are performed using different parts of the body at the same time, such as a case in which a switch is turned on with the left hand while an object is held with the right hand, for example. If it is possible to individually recognize and evaluate the motions performed using the different parts of the body in the case in which such operations are evaluated, it is possible to evaluate advanced techniques of performing different motions at the same time, for example.

However, according to Patent Documents 1 and 2, the motions performed by the different parts of the body are considered to be an integrated motion, the entire motion is simply recognized as a target of evaluation or the like, and it is thus not possible to individually recognize the motions performed using the different parts of the body.

Thus, the disclosure provides a motion recognition apparatus, a motion recognition method, a motion recognition program, and a motion recognition system capable of individually recognizing motions performed using different parts of the body.

SUMMARY

According to an aspect of the present disclosure, there is provided a motion recognition apparatus including: an acquisition unit configured to acquire time series information regarding motions of an operator; a motion recognition unit configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator; and a display unit configured to display the motion recognition result of each body part in a chronologically aligned manner on the basis of the generated motion recognition result.

According to another aspect of the present disclosure, there is provided a motion recognition method including: acquiring time series information regarding motions of an operator; recognizing, on the basis of motion information that defines individual motions and the time series information, a motion of the operator corresponding to any one of the individual motions for each body part of the operator and generating a motion recognition result including a start time and an end time of the one of the individual motions corresponding to the recognized motion of the operator for each body part of the operator; and displaying the motion recognition result of each body part in a chronologically aligned manner on the basis of the generated motion recognition result.

According to another aspect of the present disclosure, there is provided a motion recognition program that causes a computer to function as: an acquisition unit configured to acquire time series information regarding motions of an operator; a motion recognition unit configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator; and a display unit configured to display the motion recognition result of each body part in a chronologically aligned manner on the basis of the generated motion recognition result.

According to another aspect of the present disclosure, there is provided a motion recognition system including: a sensor; and a motion recognition apparatus, in which the sensor includes a detection unit configured to detect motions of an operator and output time series information regarding the motions, the motion recognition apparatus includes an acquisition unit configured to acquire the time series information, a motion recognition unit configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator, and a display unit configured to display the motion recognition result of each body part in a chronologically aligned manner on the basis of the generated motion recognition result.

(A) and (B) of FIG. 4 are diagrams illustrating an example of motion recognition result information stored in the motion recognition apparatus according to the embodiment.

Figure 5:
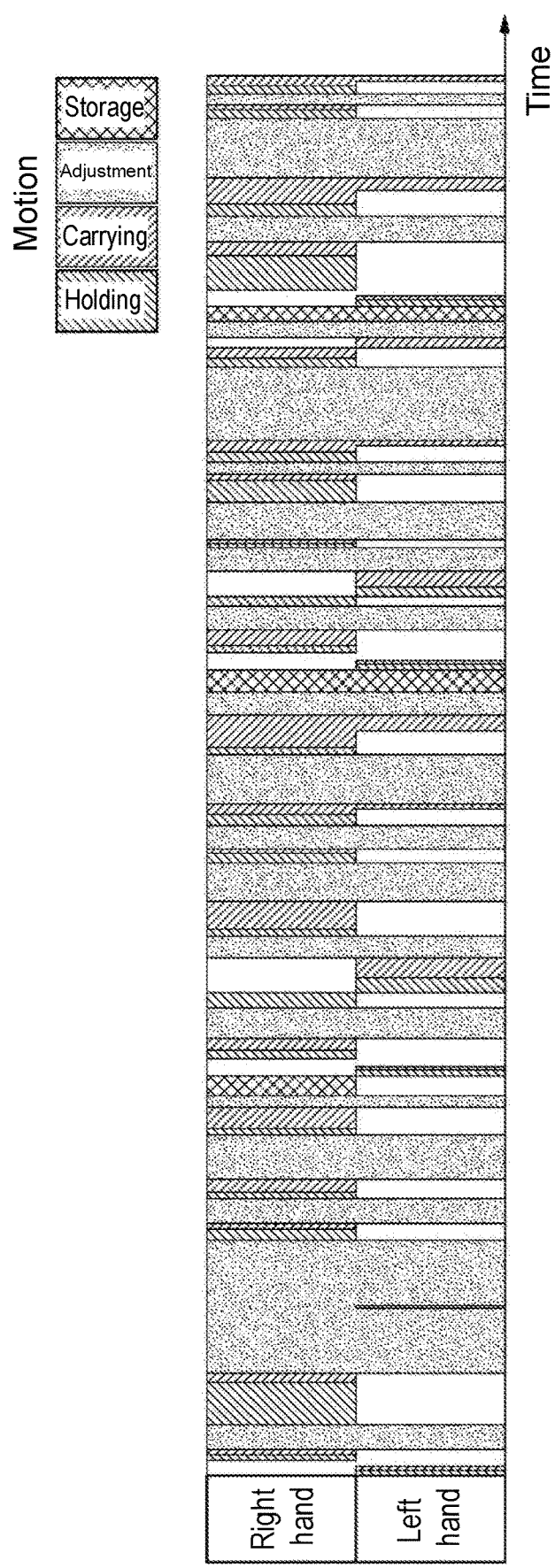

FIG. 5 is a diagram illustrating an example in which a motion recognition result of each body part is displayed in a chronologically aligned manner.

Figure 6:
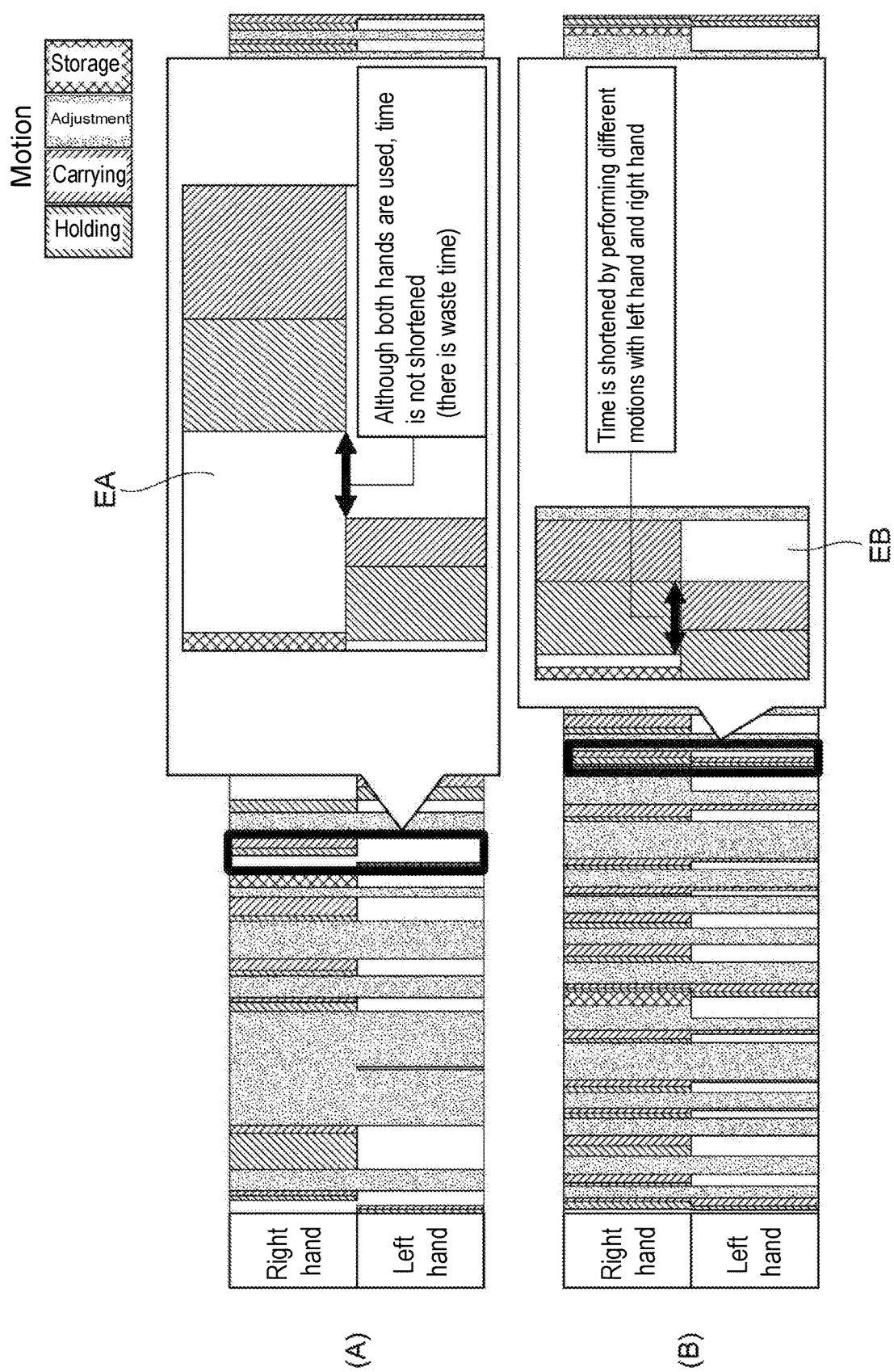

(A) and (B) of FIG. 6 are diagrams for explaining a motion recognition result of each body part.

Figure 7:
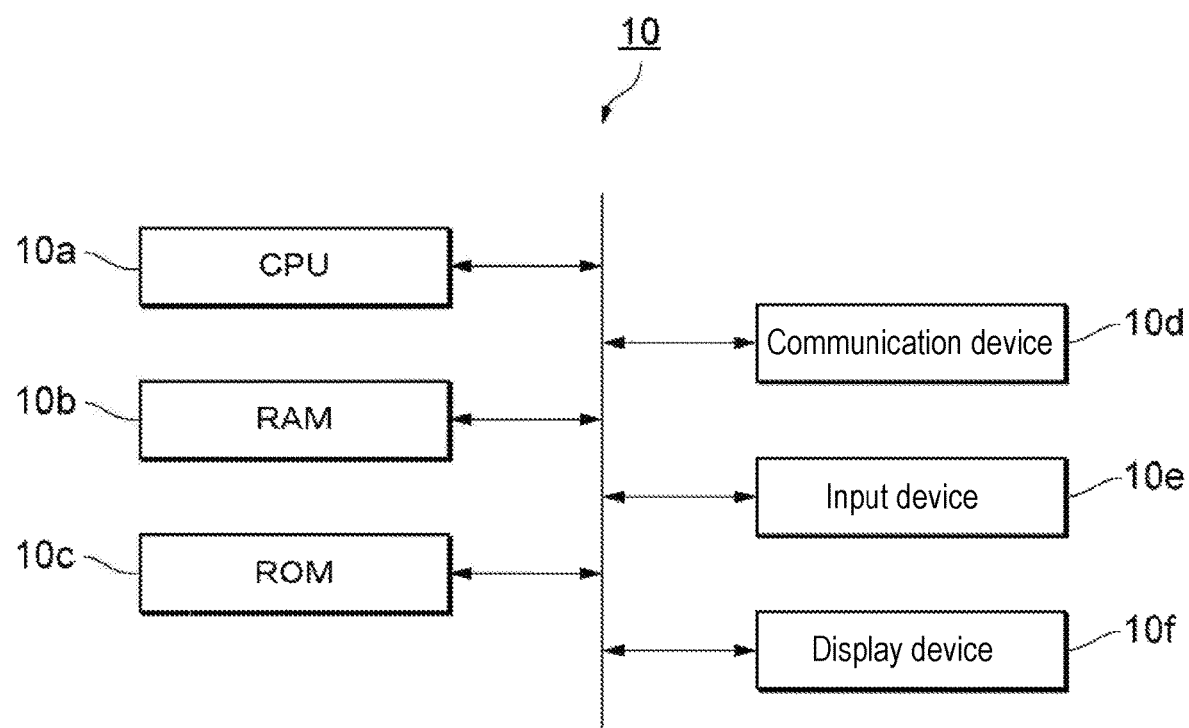

FIG. 7 is a diagram illustrating, as an example, a hardware configuration of the motion recognition apparatus according to the embodiment.

Figure 8:
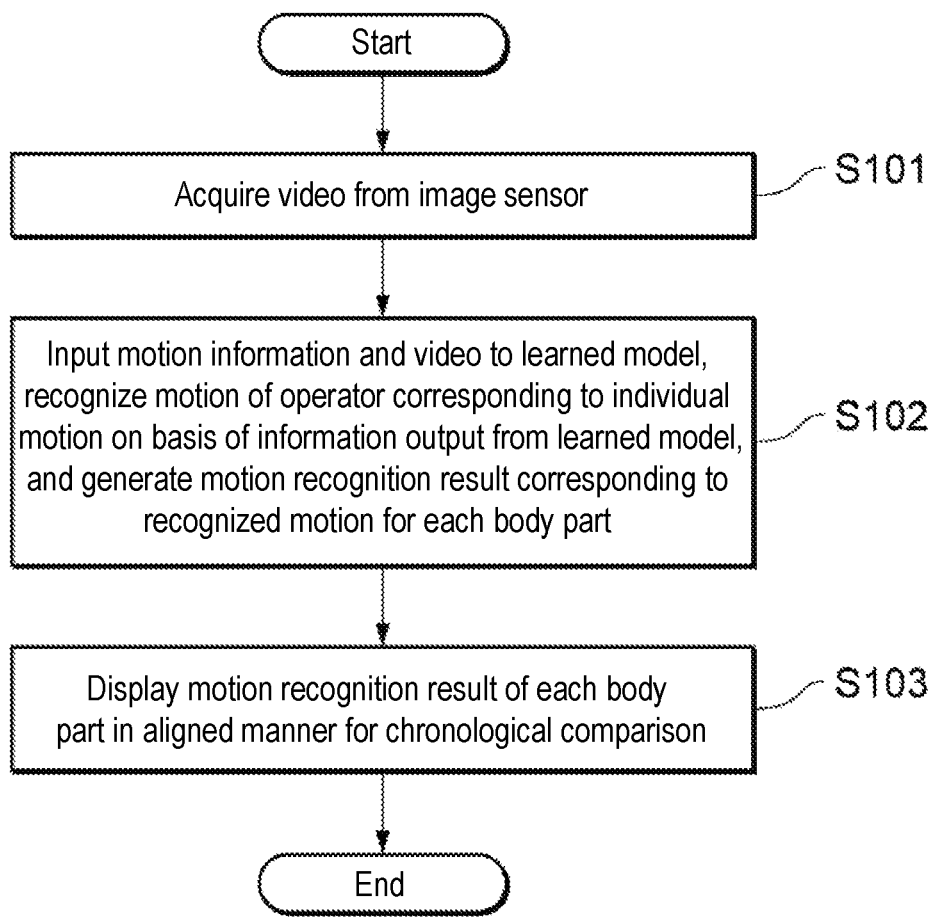

FIG. 8 is a flowchart of motion recognition processing executed by the motion recognition apparatus according to the embodiment.

DESCRIPTION OF THE EMBODIMENTS

According to this aspect, it is possible to recognize the motion of the operator for each body part corresponding to any one of the individual motions on the basis of the motion information that defines the individual motions and the time series information regarding the motions of the operator, to generate the motion recognition result including the start time and the end time of the one of the individual motions corresponding to the recognized motion for each body part, and further to display the motion recognition result of each body part in an aligned manner so that the motion recognition result can be chronologically compared.

In the aforementioned aspect, the motion recognition apparatus may further include: a learned model configured to have, as inputs, the motion information and the time series information and have, as an output, information indicating the motion of the operator corresponding to any one of the individual motions, and the motion recognition unit may input the motion information and the time series information to the learned model and recognize the motion of the operator corresponding to any one of the individual motions for each body part of the operator on the basis of information indicating the motion of the operator corresponding to any one of the individual motions output from the learned model.

According to this aspect, it is possible to input the motion information and the time series information to the learned model and recognize, for each body part, the motion of the operator corresponding to any one of the individual motions for each body part on the basis of the information that is output from the learned model and indicates the motion of the operator corresponding to any one of the individual motions when the motions of the operator are recognized.

In the aforementioned aspect, the motion recognition unit may generate the motion recognition result by calculating the start time and the end time of each motion of the operator recognized for each body part of the operator and associating the calculated start time and the end time with the individual motion.

According to this aspect, it is possible to generate the motion recognition result by calculating the start time and the end time of each motion of the operator recognized for each body part of the operator and associating the calculated start time and end time with each of the individual motions when the motion recognition result is generated.

In the aforementioned aspect, the time series information may be a video output from an image sensor, and the motion recognition unit may extract a skeleton of the operator on the basis of the video and recognize the motion of the operator corresponding to any one of the individual motions for each body part of the operator on the basis of movement of the extracted skeleton.

According to this aspect, it is possible to extract the skeleton of the operator on the basis of the video output by the image sensor and to recognize the motion of the operator corresponding to any one of the individual motions for each body part on the basis of the movement of the extracted skeleton when the motions of the operator is recognized In the aforementioned aspect, the time series information may be a video output from an image sensor, and the motion recognition unit may extract feature amounts of movement of the operator from the video image of the video and recognize the motion of the operator corresponding to any one of the individual motions for each body part of the operator on the basis of the extracted feature amount.

According to this aspect, it is possible to extract the feature amounts of movement of the operator from the image of the video output by the image sensor and to recognize the motion of the operator corresponding to any one of the individual motions for each body part on the basis of the extracted feature amounts of the movement when the motions of the operator are recognized.

In the aforementioned aspect, the body parts of the operator may include the right hand, the left hand, and the eyes of the operator.

According to this aspect, it is possible to recognize the motion of the operator corresponding to any one of the individual motions for each of the right hand, the left hand, and the eyes, to generate the motion recognition result corresponding to the recognized motion for each of the right hand, the left hand, and the eyes, and to display the motion recognition result in an aligned manner such that the motion recognition result can be chronologically compared.

According to this aspect, it is possible to recognize, for each body part, the motion of the operator corresponding to any one of the individual motions on the basis of the motion information that defines the individual motions and the time series information regarding the motions of the operator, to generate, for each body part, the motion recognition result including the start time and the end time of the one of the individual motions corresponding to the recognized motion, and further to display the motion recognition result of each body part in an aligned manner such that the motion recognition result can be chronologically compared.

According to this aspect, it is possible to recognize, for each body part, the motion of the operator corresponding to any one of the individual motions on the basis of the motion information that defines the individual motions and the time series information regarding the motions of the operator, to generate, for each body part, the motion recognition result including the start time and the end time of the one of the individual motions corresponding to the recognized motion, and further to display the motion recognition result of each body part in an aligned manner such that the motion recognition result can be chronologically compared.

According to this aspect, it is possible to recognize, for each body part, the motion of the operator corresponding to any one of the individual motions on the basis of the motion information that defines the individual motions and the time series information regarding the motions of the operator, to generate, for each body part, the motion recognition result including the start time and the end time of the one of the individual motions corresponding to the recognized motion, and further to display the motion recognition result of each body part in an aligned manner such that the motion recognition result can be chronologically compared.

According to the disclosure, it is possible to provide a motion recognition apparatus, a motion recognition method, a motion recognition program, and a motion recognition system capable of individually recognizing a motion performed by each body part.

Hereinafter, an embodiment according to an aspect of the disclosure (hereinafter described as "the embodiment") will be described on the basis of the drawings. Note that components with the same reference signs applied thereto in each drawing have the same or similar configurations.

§ 1 Application Example

Figure 1:
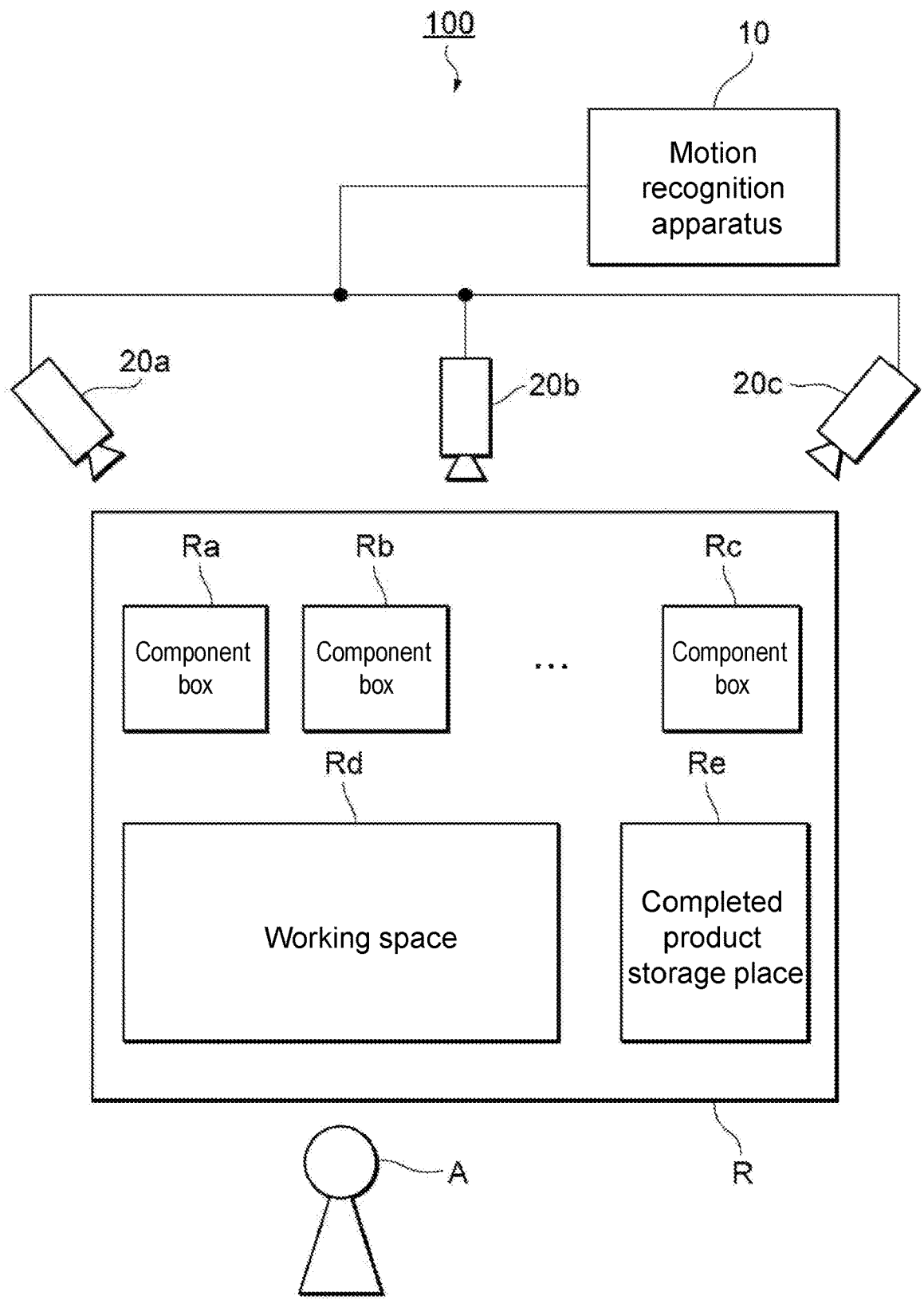
FIG. 1 is a diagram illustrating, as an example, an overview of a motion recognition system according to an embodiment of the disclosure.

First, an example of a situation to which the disclosure is applied will be described using FIG. 1. A motion recognition system 100 according to the embodiment is adapted such that motions of an operator A performed in a certain working area R are imaged using image sensors 20a, 20b, and 20c and a motion recognition apparatus 10 that has acquired the imaged videos recognizes a motion of each body part of the operator A and displays the recognition result in a chronologically aligned manner for each body part.

Although the embodiment will be described using the right hand, the left hand, and the eyes as body parts of the operator A, the body parts of the operator A that are used are not limited thereto. For example, the head, the right fingers, the left fingers, the right leg, the left leg, and the like may be used as body parts of the operator A.

Motions of the operator A can include, for example, a motion of visually recognizing a component stored in each of component boxes Ra, Rb, and Re, a motion of holding the visually recognized component, a motion of carrying a held component to a working space Rd, a motion of adjusting a component such as a motion of assembling the component that has been carried to the working space Rd, and a motion of storing a completed product in a storage place Re.

The individual motions that are targets of recognition performed by the motion recognition apparatus 10 are stored as motion information in advance. The motion recognition apparatus 10 recognizes a motion of the operator A corresponding to any one of the individual motions for each body part of the operator A on the basis of the motion information and the videos. Then, the motion recognition apparatus 10 generates, for each body part of the operator A, motion recognition result information including times at which the one of the motions corresponding to the recognized motion of the operator A is started and ended. Further, the motion recognition apparatus 10 displays the motion recognition result of each body part in an aligned manner such that the motion recognition result can be chronologically compared, on the basis of the generated motion recognition result information.

Thus, the motion recognition apparatus 10 according to the embodiment can individually recognize the motion performed by each body part of the operator A and further display the motion recognition result of each body part in a chronologically aligned manner.

§ 2 Configuration Example

Functional Configuration

Figure 2:
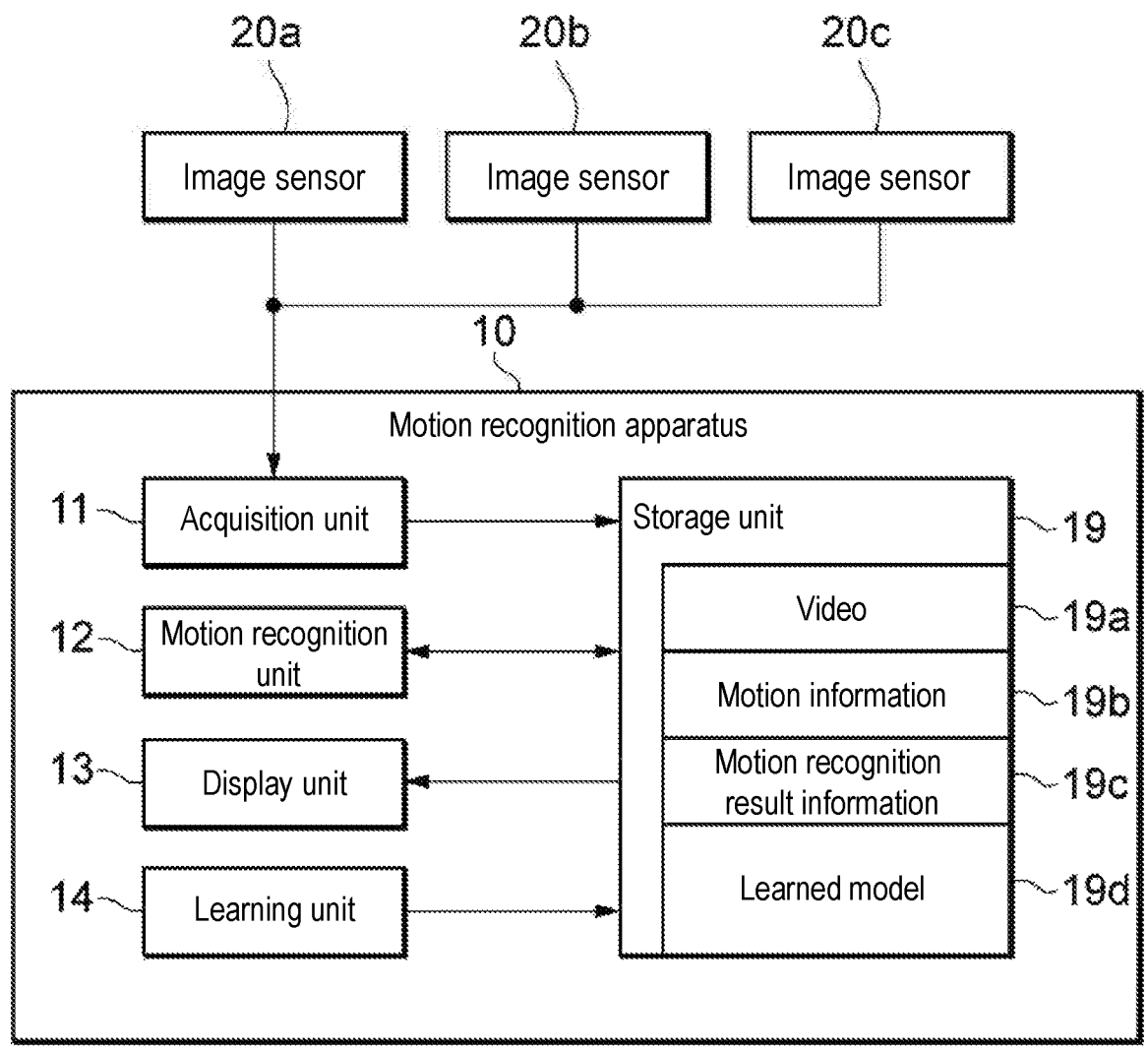
FIG. 2 is a diagram illustrating, as an example, a functional configuration of the motion recognition system according to the embodiment.

Next, an example of a functional configuration of the motion recognition system 100 according to the embodiment will be described using FIG. 2. The motion recognition system 100 includes the three image sensors 20a, 20b, and 20c and the motion recognition apparatus 10. Hereinafter, the three image sensors 20a, 20b, and 20c will be described as an image sensor 20 in cases in which it is not particularly necessary to describe the image sensors 20a, 20b, and 20c in a distinguished manner. The motion recognition apparatus 10 has, as functional configurations, an acquisition unit 11, a motion recognition unit 12, a display unit 13, a learning unit 14, and a storage unit 19, for example. The storage unit 19 stores a video 19a, motion information 19b, motion recognition result information 19c, and a learned model 19d, for example. Details of each functional configuration will be described below in order.

Image Sensor

The image sensor 20 is, for example, a general-purpose camera and images a video including a situation in which the operator A performs a motion in the working area R. The image sensor 20 has the detection unit as a functional configuration, for example. The detection unit detects the motion of the operator A and outputs the video indicating the motion as time series information.

Here, the time series information is not limited to the video. For example, the time series information may be information regarding coordinate values indicating the motion of the operator A measured through a motion capturer provided instead of the image sensor 20, information indicating the motion of the operator A measured by attaching an acceleration sensor or a gyro sensor provided instead of the image sensor 20 to the operator A, or information indicating the motion of the operator A estimated from a state of being in or out of a specific area detected by a photoelectric sensor disposed in the working area R instead of the image sensor 20.

Each of the image sensors 20a, 20b, and 20c is disposed such that the entire working area R and the whole body of the operator A can be imaged. For example, each of the image sensors 20a, 20b, and 20c may be disposed such that the entire working area R and the whole body of the operator A can be imaged, or each of the image sensors 20a, 20b, and 20c may be disposed such that it can image a part of the working area R and the operator A and the entire working area R and the whole body of the operator A can be covered by combining the videos. Also, each of the image sensors 20a, 20b, and 20c may image the working area R and the operator A at a different magnification. It is not necessary to provide three image sensors 20, and at least one image sensor 20 may be provided.

Acquisition Unit

The acquisition unit 11 acquires time series information (a video in the embodiment) regarding the motions performed by the operator A from the image sensor 20. The time series information acquired by the acquisition unit 11 is transmitted to the storage unit 19 and is stored therein as a video 19a.

Motion Recognition Unit

The motion recognition unit 12 recognizes a motion of the operator A corresponding to any one of the individual motions set in the motion information 19b for each aforementioned body part of the operator A on the basis of the motion information 19b that defines the individual motions and the video 19a.

Figure 3:
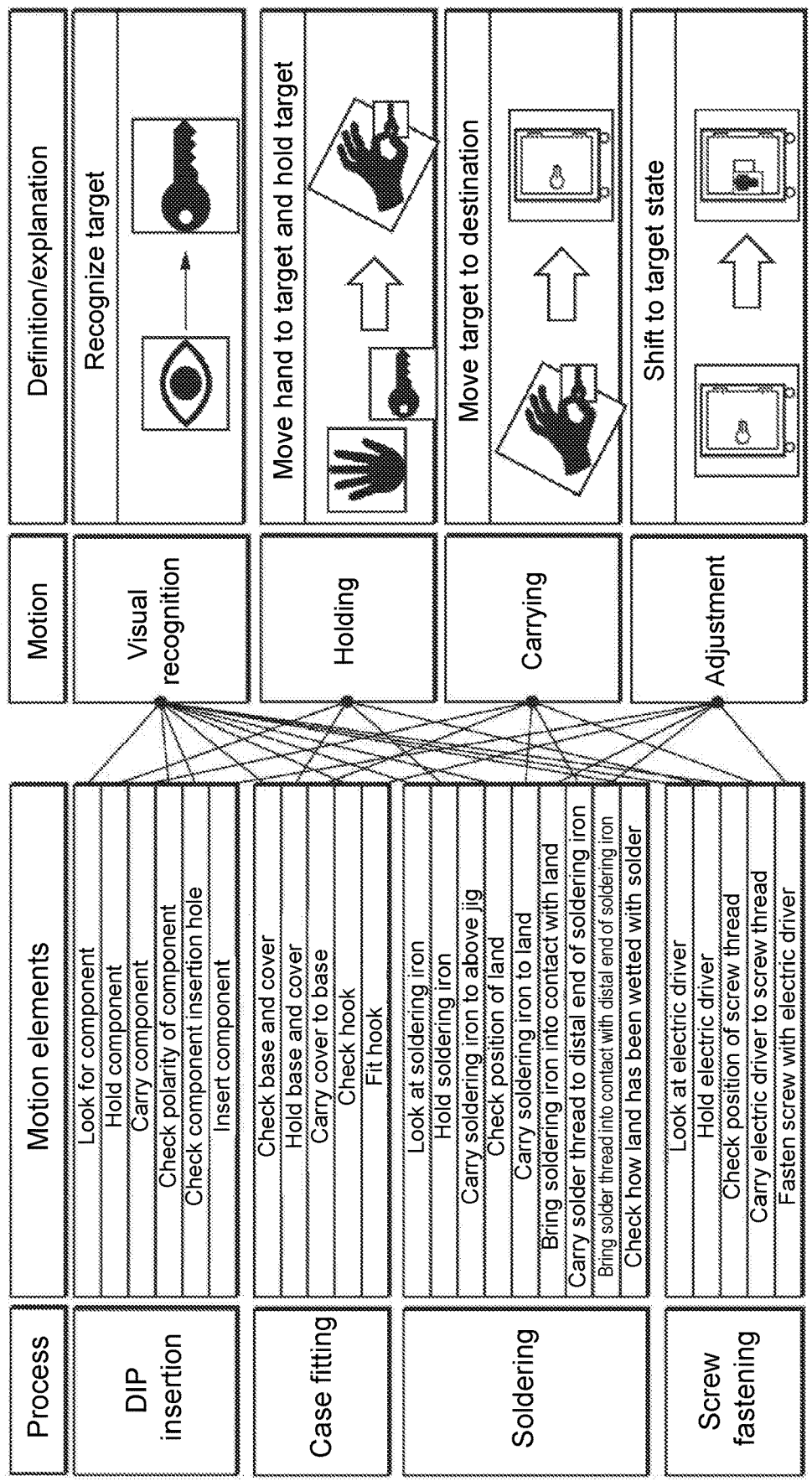
FIG. 3 is a diagram illustrating an example of motion information stored in the motion recognition apparatus according to the embodiment.

Referring to FIG. 3, an example of the motion information 19b will be described. Four motions, namely visual recognition, holding, carrying, and adjustment, are set as examples of the individual motions in the motion information 19b illustrated in the drawing.

In the motion information 19b, the visual recognition is defined as a motion of recognizing a target, the holding is defined as a motion of moving a hand to the target and holding the target, the carrying is defined as a motion of moving the target to a destination, and the adjustment is defined as a motion of shifting to a target state.

As elements corresponding to visual motions, a motion of looking for a component, a motion of checking polarity of the component, and a motion of checking a component insertion hole among motions included in a DIP insertion process are set, a motion of checking a base and a cover and a motion of checking a hook among motions included in a case fitting process are set, a motion of looking at a soldering iron, a motion of checking the position of a land, and a motion of checking how wet the land is with solder among motions included in a soldering process are set, and a motion of looking at an electric driver and a motion of checking the position of a screw thread among motions included in a screw fastening process are set.

As elements corresponding to holding motions, a motion of holding the component among the motions included in the DIP insertion process is set, a motion of holding the base and the cover among the motions included in the case fitting process is set, a motion of holding the soldering iron among the motions included in the soldering process is set, and a motion of holding the electric driver among the motions included in the screw fastening process is set.

As elements corresponding to carrying motions, a motion of carrying the component among the motions included in the DIP insertion process is set, a motion of carrying the cover to the base among the motions included in the case fitting process is set, a motion of carrying the soldering iron to the land and a motion of carrying a solder thread to a distal end of the soldering iron among the motions included in the soldering process are set, and a motion of carrying the electric driver to the screw thread among the motions included in the screw fastening process is set.

As elements corresponding to adjustment motions, a motion of inserting the component among the motions included in the DIP insertion process is set, a motion of fitting the hook among the motions included in the case fitting process is set, and a motion of bringing the soldering iron into contact with the land and a motion of bringing the solder thread into contact with the distal end of the soldering iron among the motions included in the soldering process are set, and a motion of fastening the screw using the electric driver among the motions included in the screw fastening process is set.

Note that, although FIG. 3 illustrates, as an example, the motion information 19b in a case in which the motions, namely the visual recognition, the holding, the carrying, and the adjustment, are set as the individual motions, motions set as the individual motions are not limited to these motions. The motions set as the individual motions can be appropriately defined in accordance with details of work that the operator A performs. For example, a storage motion of storing a completed product in a storage location may be set in the individual motions instead of the visual recognition motion among the aforementioned four motions.

In addition, each of the elements of the motions illustrated as examples in FIG. 3 can also be set as the individual motions. In this case, it is preferable to set, as the individual motions, only the elements for which start timings of the motions and end timings of the motions can be determined on the basis of the video 19a in a limited manner from among the elements of the motions illustrated as examples in FIG. 3.

The description will now return to FIG. 2. In a case in which the motion recognition unit 12 recognizes, for each body part, the motion of the operator A corresponding to any one of the individual motions set in the motion information 19b, the motion recognition unit 12 calculates a start time and an end time of the one of the individual motions corresponding to the recognized motion of the operator A. The start time and the end time can be defined by assuming a time at which the first process among all processes that are targets of work is started as a reference, for example, and calculating an elapsed time from the reference time. Then, the motion recognition unit 12 generates a motion recognition result of each body part by associating the calculated start time and end time with each one of the individual motions. The motion recognition result of each body part generated by the motion recognition unit 12 is transmitted to the storage unit 19 and stored therein as motion recognition result information 19c.

Referring to FIG. 4, the motion recognition result information 19c will be described. (A) of FIG. 4 illustrates, as an example, the motion recognition result information 19c regarding the left hand of the operator A while (B) of FIG. 4 illustrates, as an example, the motion recognition result information 19c regarding the right hand of the operator A.

The motion recognition result information 19c regarding the left hand illustrated as an example in (A) of FIG. 4 indicates that the left hand motion of the operator A is recognized as not corresponding to any of the individual motions for 12 seconds after the first process starts, the left hand motion of the operator A is recognized as corresponding to the holding motion among the individual motions from 12 seconds to 13 seconds, and the left hand motion of the operator A is recognized as corresponding to the carrying operation among the individual motions from 13 seconds to 15 seconds.

The motion recognition result information 19c regarding the right hand illustrated as an example in (B) of FIG. 4 indicates that the right hand motion of the operator A is recognized as not corresponding to any of the individual motions for 10 seconds after the first process starts, the right hand motion of the operator A is recognized as corresponding to the holding motion among the individual motions from 10 seconds to 11 seconds, and the right hand motion of the operator A is recognized to correspond to the carrying operation among the individual motions from 11 seconds to 12 seconds.

The description will now return to FIG. 2. The motion recognition unit 12 can use the learned model 19d to recognize a motion of the operator A corresponding to any one of the individual motions. The learned model 19d is a learned model that has the motion information 19b and the video 19a as inputs and has information indicating the motion of the operator A corresponding to any one of the individual motions as an output and is generated by the learning unit 14. The learned model 19d can be learned by the following method (a) or (b), for example.

(a) A person who is in charge identifies a motion corresponding to one of the individual motions while visually checking the video 19a and creates teacher data that defines a start time or an end time of the identified motion for each body part. The learning unit 14 causes the learned model 19d to learn a correspondence between the individual motions of each body part with the motions of each body part included in the video 19a by inputting the teacher data in addition to the motion information 19b and the video 19a to the learned model 19d.

(b) The learning unit 14 extracts a change point at which an image of the video 19*a* (video image) suddenly changes as a candidate point at which the individual motions start or end. The person who is in charge creates teacher data by defining a start time or an end time of the motion corresponding to one of the individual motions and a body part that performs the motion for each extracted candidate point while visually checking the video 19*a*. The learning unit 14 causes the learned model 19*d* to learn a correspondence between the individual motions of each body part and the motions of each body part included in the video 19*a* by inputting the teacher data in addition to the motion information 19*b* and the video 19*a* to the learned model 19*d*.

The motion recognition unit 12 inputs the motion information 19*b* and the video 19*a* to the learned model 19*d* that is caused to perform learning as described above and recognizes the motion of the operator A corresponding to any one of the individual motions for each body part of the operator A on the basis of the information indicating the motion of the operator A corresponding to any one of the individual motions output from the learned model 19*d*.

The motion recognition unit 12 can recognize the motions of each body part of the operator A using the following method (1) or (2), for example, when the motion recognition unit 12 performs the recognition on the basis of the video 19*a*.

(1) Skeleton data indicating movement of the skeleton of the operator A is extracted from the image of the video 19*a*, and the motion of each body part of the operator A is recognized on the basis of the extracted skeleton data. As a method of recognizing the motion on the basis of the skeleton data extracted from the image, it is possible to use a known motion recognition method such as a spatial temporal graph convolutional network (ST-GCN), for example.

(2) Feature amounts of movement of the operator A are extracted from the image of the video 19*a*, and the motion of each body part of the operator A is recognized on the basis of the extracted feature amounts of the movement. As a method of extracting the feature amounts of the movement from the image, it is possible to use a known feature amount extraction method such as scale-invariant feature transform (SIFT) or a speeded up robust feature (SURF), for example.

The motion recognition unit 12 can arbitrarily set intervals at which the motion is recognized, and for example, the recognition may be performed in units of frame rates of the video, or the recognition may be performed at a predetermined time such as every second. Display unit The display unit 13 displays the motion recognition result of each body part in a chronologically aligned manner on the basis of the motion recognition information 19*c*. FIG. 5 illustrates, as an example, a graph in which the motion recognition result of each body part is displayed in a chronologically aligned manner. In the drawing, the right hand and left hand motions are recognized as motions of body parts, and recognition results thereof are displayed in a chronologically aligned manner. The horizontal axis represents elapse of time, the upper section represents a motion state of the right hand, and the lower section represents a motion state of the left hand.

In FIG. 5, holding, carrying, adjustment, and storing motions are recognized as individual motions. It is possible to ascertain that the holding and the carrying are performed mainly by the right hand and the adjustment and the storing are performed mainly by both hands.

FIG. 6 illustrates, as an example, diagrams representing each of motion states of both hands of a non-skilled person and a skilled person using a graph. (A) of FIG. 6 is a diagram in which motion states of the right hand and the left hand of the non-skilled person are displayed in a chronologically aligned manner. (B) of FIG. 6 is a diagram in which motion states of the right hand and the left hand of the skilled person are displayed in a chronologically aligned manner. In (A) and (B) of FIG. 6, the holding, carrying, adjustment, and storing motions are recognized as the individual motions.

It is possible to ascertain that the non-skilled person in (A) of FIG. 6 has a varying working rhythm as compared with the skilled person in (B) of FIG. 6 and that there is a time during which the non-skilled person does not perform working with both hands together. Further, it is possible to ascertain from the enlarged view EA illustrating a part of the graph in (A) of FIG. 6 in an enlarged manner that the non-skilled person performs working using his/her right and left hands while a time during which both the right hand and the left hand do not move, that is, a waste time occurs as in the section represented by the two-way arrow in the enlarged view EA.

On the other hand, it is possible to ascertain that the skilled person in (B) of FIG. 6 has a constant working rhythm as compared with the non-skilled person in (B) of FIG. 6 and that the skilled person constantly performs working using his/her right hand. Further, it is possible to ascertain from the enlarged view EB illustrating a part of the graph in (B) of FIG. 6 in an enlarged manner that the skilled person performs working using his/her both hands for a long time, that different motions are performed using the right hand and the left hand, and that the working time is shortened as in the section represented by the two-way arrow in the enlarged view EB.

Hardware Configuration

Next, an example of a hardware configuration of the motion recognition apparatus 10 according to the embodiment will be described using FIG. 7. The motion recognition apparatus 10 has a central processing unit (CPU) 10*a* corresponding to a computation device, a random access memory (RAM) 10*b* corresponding to the storage unit 19, a read only memory (ROM) 10*c* corresponding to the storage unit 19, a communication device 10*d*, an input device 10*e*, and a display device 10*f* corresponding to the display unit 13. These configurations are connected so as to be able to transmit and receive data to and from each other via a bus. Note that a case in which the motion recognition apparatus 10 is configured of a single computer will be described in the embodiment, the motion recognition apparatus 10 may be implemented using a plurality of computers.

The CPU 10*a* functions as a control unit that executes a program stored in the RAM 10*b* or the ROM 10*c* and performs an arithmetic operation or working of data. The CPU 10*a* receives various kinds of input data from the input device 10*e* and the communication device 10*d*, displays a result obtained by performing an arithmetic operation on the input data on the display device 10*f*, and stores the result in the RAM 10*b* and the ROM 10*c*. The CPU 10*a* in the embodiment executes a program (motion recognition program) of recognizing a motion of each body part of the operator on the basis of a video and displaying the recognized result in a chronologically aligned manner for each body part.

The RAM 10*b* is configured of a semiconductor storage element, for example, and stores rewritable data. The ROM 10*c* is configured of a semiconductor storage element, for example, and stores readable and non-rewritable data.

The communication device 10*d* is an interface that connects the motion recognition apparatus 10 to an external device. The communication device 10d is connected to the image sensor 20, for example, via a communication network such as a local area network (LAN) or the Internet and receives a video from the image sensor 20.

The input device 10e is an interface that receives an input of data from the user and can include, for example, a keyboard, a mouse, and a touch panel.

The display device 10f is an interface that visually displays an arithmetic operation result and the like obtained by the CPU 10a and is configured of a liquid crystal display (LCD), for example.

The motion recognition program may be stored and provided in a computer-readable storage medium such as a RAM 10b or a ROM 10c or may be provided via a communication network connected using the communication device 10d. The motion recognition apparatus 10 realizes motions of the acquisition unit 11, the motion recognition unit 12, the display unit 13, and the learning unit 14 illustrated in FIG. 2 by the CPU 10a executing the motion recognition program. Note that these physical configurations are just examples and are not necessarily independent configurations. For example, the motion recognition apparatus 10 may include a large-scale integration (LSI) in which the CPU 10a, the RAM 10b, and the ROM 10c are integrated.

Section 3. Motion Example

FIG. 8 is a flowchart illustrating an example of motion recognition processing executed by the motion recognition apparatus 10 according to the embodiment.

First, the acquisition unit 11 of the motion recognition apparatus 10 acquires, from the image sensor 20, a video that is time series information regarding motions performed by the operator A (Step S101). The acquired video is stored as the video 19a in the storage unit 19.

Next, the motion recognition unit 12 of the motion recognition apparatus 10 inputs the motion information 19b and the video 19a to the learned model 19d, recognizes motions of the operator A corresponding to the individual motions on the basis of information indicating the motions of the operator A corresponding to the individual motions output from the learned model 19d, and generates, for each body part, a motion recognition result corresponding to the recognized motions of the operator A (Step S102). The generated motion recognition result is stored as the motion recognition result information 19c in the storage unit 19.

Next, the display unit 13 of the motion recognition apparatus 10 displays the motion recognition result of each body part in an aligned manner such that the motion recognition result can be chronologically compared, on the basis of the motion recognition result information 19c (Step S103). Then, the motion recognition processing is ended.

As described above, the motion recognition apparatus 10 according to the embodiment can recognize, for each body part, a motion of the operator corresponding to any one of the individual motions and generate, for each body part, the motion recognition result information 19c corresponding to the recognized motion, on the basis of the motion information 19b and the video 19a. Further, the motion recognition apparatus 10 according to the embodiment can display the motion recognition result of each body part in an aligned manner such that the motion recognition result can be chronologically compared, on the basis of the generated motion recognition result information 19c.

The embodiment of the disclosure can also be described as the following supplements. However, the embodiment of the disclosure is not limited to the forms described in the following supplements. Also, the embodiment of the disclosure may be a form achieved by replacing or combining description of the supplements.

Supplement 1

A motion recognition apparatus (10) including: an acquisition unit (11) configured to acquire time series information regarding motions of an operator; a motion recognition unit (12) configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator; and a display unit (13) configured to display the motion recognition result of each body part in a chronologically aligned manner on the basis of the generated motion recognition result.

Supplement 2

The motion recognition apparatus (10) according to supplement 1, further including: a learned model (19d) configured to have, as inputs, the motion information and the time series information and have, as an output, information indicating the motion of the operator corresponding to any one of the individual motions, in which the motion recognition unit (12) inputs the motion information and the time series information to the learned model (19d) and recognizes the motion of the operator corresponding to any one of the individual motions for each body part of the operator on the basis of information indicating the motion of the operator corresponding to any one of the individual motions output from the learned model (19d).

Supplement 3

The motion recognition apparatus (10) according to supplement 1 or 2, in which the motion recognition unit (12) generates the motion recognition result by calculating the start time and the end time of each motion of the operator recognized for each body part of the operator and associating the calculated start time and the end time with the individual motion.

Supplement 4

The motion recognition apparatus (10) according to any one of supplements 1 to 3, in which the time series information is a video output from an image sensor (20a), and the motion recognition unit (12) extracts a skeleton of the operator on the basis of the video and recognizes the motion of the operator corresponding to any one of the individual motions for each body part of the operator on the basis of movement of the extracted skeleton.

Supplement 5

The motion recognition apparatus (10) according to any one of supplements 1 to 3, in which the time series information is a video output from an image sensor (20a), and the motion recognition unit (12) extracts feature amounts of movement of the operator from a video image of the video and recognize the motion of the operator corresponding to any one of the individual motions for each body part of the operator on the basis of the extracted feature amount.

Supplement 6

The motion recognition apparatus (10) according to any one of supplements 1 to 5, in which the body parts of the operator include the right hand, the left hand, and the eyes of the operator.

Supplement 7

A motion recognition method including: acquiring time series information regarding motions of an operator; recognizing, on the basis of motion information that defines individual motions and the time series information, a motion of the operator corresponding to any one of the individual motions for each body part of the operator and generating a motion recognition result including a start time and an end time of the one of the individual motions corresponding to the recognized motion of the operator for each body part of the operator; and displaying the motion recognition result of each body part in an aligned manner such that the motion recognition result can be chronologically compared on the basis of the generated motion recognition result.

Supplement 8

A motion recognition program that causes a computer to function as: an acquisition unit (11) configured to acquire time series information regarding motions of an operator; a motion recognition unit (12) configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator; and a display unit (13) configured to display the motion recognition result of each body part in a chronologically aligned manner on the basis of the generated motion recognition result.

Supplement 9

A motion recognition system (100) including: a sensor (20a, 20b, 20c); and a motion recognition apparatus (10), in which the sensor (20a, 20b, 20c) includes a detection unit configured to detect motions of an operator and output time series information regarding the motions, the motion recognition apparatus (10) includes an acquisition unit (11) configured to acquire the time series information, a motion recognition unit (12) configured to recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator, and a display unit (13) configured to display the motion recognition result of each body part in a chronologically aligned manner on the basis of the generated motion recognition result.

What is claimed is:

1. A motion recognition apparatus comprising:
a processor configured to:
acquire time series information regarding motions of an operator; and
recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator, wherein the motion information comprises a corresponding relationship between the individual motions and motion elements in individual processes, the individual processes comprises an insertion process, a case fitting process, a soldering process and a screw fastening process; and
a display configured to display the motion recognition result of each body part in a chronologically aligned manner on the basis of the generated motion recognition result,
the motion recognition apparatus further comprising:
a learned model configured to have, as inputs, teacher data, the motion information and the time series information and have, as an output, information indicating the motion of the operator corresponding to any one of the individual motions, the teacher data that defines a start time or an end time of an identified motion for each body part.

2. The motion recognition apparatus according to claim 1, wherein the processor inputs the teacher data, the motion information and the time series information to the learned model and recognizes the motion of the operator corresponding to any one of the individual motions for each body part of the operator on the basis of information indicating the motion of the operator corresponding to any one of the individual motions output from the learned model.

3. The motion recognition apparatus according to claim 1, wherein the processor generates the motion recognition result by calculating the start time and the end time of each motion of the operator recognized for each body part of the operator and associating the calculated start time and the end time with the individual motion.

4. The motion recognition apparatus according to claim 1,
wherein the time series information is a video output from an image sensor, and
the processor extracts a skeleton of the operator on the basis of the video and recognizes the motion of the operator corresponding to any one of the individual motions for each body part of the operator on the basis of movement of the extracted skeleton.

5. The motion recognition apparatus according to claim 1,
wherein the time series information is a video output from an image sensor, and
the processor extracts feature amounts of movement of the operator from a video image of the video and recognizes the motion of the operator corresponding to any one of the individual motions for each body part of the operator on the basis of the extracted feature amount.

6. The motion recognition apparatus according to claim 1, wherein the body parts of the operator include the right hand, the left hand, and the eyes of the operator.

7. The motion recognition apparatus according to claim 2, wherein the processor generates the motion recognition result by calculating the start time and the end time of each motion of the operator recognized for each body part of the operator and associating the calculated start time and the end time with the individual motion.

8. The motion recognition apparatus according to claim 2,
wherein the time series information is a video output from an image sensor, and
the processor extracts a skeleton of the operator on the basis of the video and recognizes the motion of the operator corresponding to any one of the individual motions for each body part of the operator on the basis of movement of the extracted skeleton.

9. The motion recognition apparatus according to claim 3,
wherein the time series information s a video output from an image sensor, and
the processor extracts a skeleton of the operator on the basis of the video and recognizes the motion of the operator corresponding to any one of the individual motions for each body part of the operator on the basis of movement of the extracted skeleton.

10. The motion recognition apparatus according to claim 2,
wherein the time series information is a video output from an image sensor, and the processor extracts feature amounts of movement of the operator from a video image of the video and recognizes the motion of the operator corresponding to any one of the individual motions for each body part of the operator on the basis of the extracted feature amount.

11. The motion recognition apparatus according to claim 3,
wherein the time series information is a video output from an image sensor, and
the processor extracts feature amounts of movement of the operator from a video image of the video and recognizes the motion of the operator corresponding to any one of the individual motions for each body part of the operator on the basis of the extracted feature amount.

12. The motion recognition apparatus according to claim 2, wherein the body parts of the operator include the right hand, the left hand, and the eyes of the operator.

13. The motion recognition apparatus according to claim 3, wherein the body parts of the operator include the right hand, the left hand, and the eyes of the operator.

14. The motion recognition apparatus according to claim 4, wherein the body parts of the operator include the right hand, the left hand, and the eyes of the operator.

15. The motion recognition apparatus according to claim 5, wherein the body parts of the operator include the right hand, the left hand, and the eyes of the operator.

16. A motion recognition method comprising:
acquiring time series information regarding motions of an operator;
recognizing, on the basis of motion information that defines individual motions and the time series information, a motion of the operator corresponding to any one of the individual motions for each body part of the operator and generating a motion recognition result including a start time and an end time of the individual motion corresponding to the recognized motion of the operator for each body part of the operator, wherein the motion information comprises a corresponding relationship between the individual motions and motion elements in individual processes, the individual processes comprises an insertion process, a case fitting process, a soldering process and a screw fastening process; and
displaying the motion recognition result of each body part in a chronologically aligned manner on the basis of the generated motion recognition result,
wherein teacher data, the motion information and the time series information are had as inputs of a learned model, information indicating the motion of the operator corresponding to any one of the individual motions is had as an output of the learned model, the teacher data that defines a start time or an end time of an identified motion for each body part.

17. A non-transitory computer readable storage medium storing motion recognition program that causes a computer to:
acquire time series information regarding motions of an operator;
recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator, wherein the motion information comprises a corresponding relationship between the individual motions and motion elements in individual processes, the individual processes comprises an insertion process, a case fitting process, a soldering process and a screw fastening process; and
display the motion recognition result of each body part in a chronologically aligned manner on the basis of the generated motion recognition result,
the computer further comprising:
a learned model configured to have, as inputs, teacher data, the motion information and the time series information and have, as an output, information indicating the motion of the operator corresponding to any one of the individual motions, the teacher data that defines a start time or an end time of an identified motion for each body part.

18. A motion recognition system comprising:
a sensor; and
a motion recognition apparatus,
wherein the sensor includes a detection unit configured to detect motions of an operator and output time series information regarding the motions,
the motion recognition apparatus includes
a processor configured to:
acquire the time series information,
recognize, on the basis of motion information that defines individual motions and the time series information, a motion of the operator corresponding to any one of the individual motions for each body part of the operator, and generate a motion recognition result including a start time and an end time of the individual motion corresponding to the recognized motion of the operator for each body part of the operator, wherein the motion information comprises a corresponding relationship between the individual motions and motion elements in individual processes, the individual processes comprises an insertion process, a case fitting process, a soldering process and a screw fastening process, and
a display configured to display the motion recognition result of each body part in a chronologically aligned manner on the basis of the generated motion recognition result,
the motion recognition apparatus further comprising:
a learned model configured to have, as inputs, teacher data, the motion information and the time series information and have, as an output, information indicating the motion of the operator corresponding to any one of the individual motions, the teacher data that defines a start time or an end time of an identified motion for each body part.

* * * * *